United States Patent [19]

Matthews

[11] Patent Number: 5,097,416

[45] Date of Patent: Mar. 17, 1992

[54] SYSTEM FOR MONITORING PLAY OF A GOLFER

[76] Inventor: Gordon H. Matthews, 3700 Lost Creek Blvd., Austin, Tex. 78735

[21] Appl. No.: 464,897

[22] Filed: Jan. 16, 1990

[51] Int. Cl.⁵ .................. G06F 15/28; G08B 23/00; A63B 67/02
[52] U.S. Cl. .............................. 364/410; 340/323 R; 273/176 L
[58] Field of Search .................. 364/410, 411; 273/176 L, 176 AB, 176 R, 32 H, 32 R; 340/323 R, 993

[56] References Cited

U.S. PATENT DOCUMENTS

| | | | |
|---|---|---|---|
| 3,472,333 | 10/1969 | Loewenstern, Jr. | 180/89 |
| 3,662,267 | 5/1972 | Reed | 340/993 |
| 4,002,983 | 1/1977 | Kavalir et al. | 340/993 |
| 4,142,680 | 3/1979 | Oswald et al. | 340/993 |
| 4,303,243 | 12/1981 | Wolfe | 273/176 R |
| 4,396,904 | 8/1983 | Hanaska | 340/323 R |
| 4,419,655 | 12/1983 | May | 273/176 L |
| 4,656,476 | 4/1987 | Tautigian | 340/993 |
| 4,701,760 | 10/1987 | Raoux | 340/993 |
| 4,702,342 | 10/1987 | Hale | 180/333 |
| 4,857,886 | 8/1989 | Crews | 340/323 R |
| 4,926,161 | 5/1990 | Cupp | 340/572 |

FOREIGN PATENT DOCUMENTS

| | | | |
|---|---|---|---|
| 0095374 | 5/1983 | Japan | 273/85 G |
| 2207787A | 2/1989 | United Kingdom . | |

Primary Examiner—Dale M. Shaw
Assistant Examiner—Xuong M. Chung
Attorney, Agent, or Firm—Baker & Botts

[57] ABSTRACT

A system for monitoring play of a golfer (24,26) comprises Location Information Transmitters (LIT) (52, 54, 56) at predetermined locations within a golf course and a Mobile Electronic Transmitter/Receiver (METAR) (48, 50) carried in association with a golfer (24,26) on a golf bag (30) or a golf cart (28).

A METAR (48) transmits a METAR code to a LIT (54), which then transmits its LIT code and the received METAR code to a Tracking Center (22) display terminal. Golf course personnel can monitor the display terminal and determine play of golfers (24, 26), golf cart (28, 34) utilization and golf hole (10, 14) utilization. When the golfer (24) causes a slow play indication, the Tracking Center (22) is notified and the slow golfer (24) is asked to increase the rate of play or leave the golf course. The METAR (48) transmission may be begun in response to the METAR (48) receiving an LIT code periodically transmitted by an LIT (52, 54, 56) over a restricted transmission range (58, 60, 62).

When the METAR (48) arrives within an LIT (54) transmission range (60), the METAR (48) receives a LIT code and subsequently initiates a counter to measure time required by the golfer (24) to move within transmission range (62) of a next LIT (56). If the counter exceeds a prescribed time, then a display on the METAR (48) indicates slow play.

23 Claims, 7 Drawing Sheets

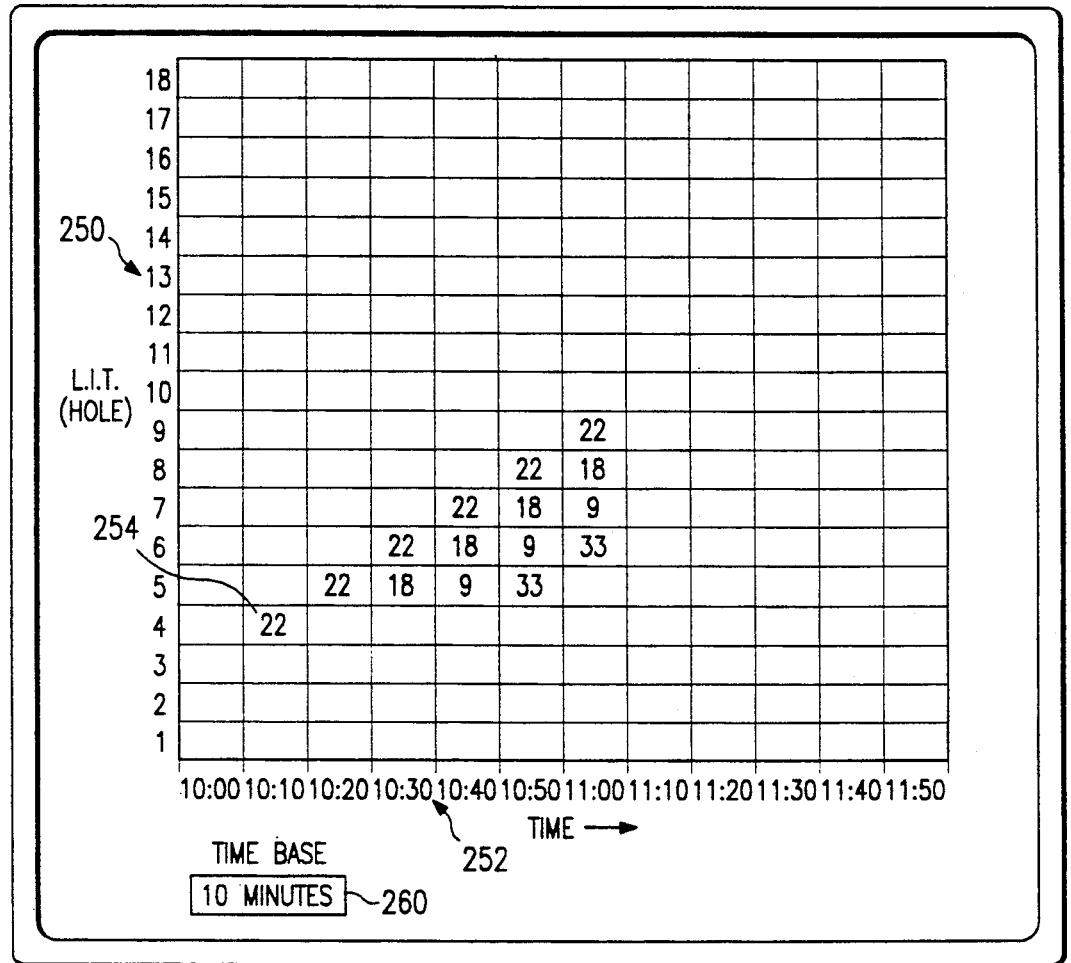

SYSTEM FOR MONITORING PLAY OF A GOLFER

TECHNICAL FIELD OF THE INVENTION

This invention pertains in general to systems for managing golf courses and more particularly to a system for monitoring play of a golfer, and golf cart and golf hole utilization in a golf course.

BACKGROUND OF THE INVENTION

Golf is increasing in popularity to an extent that available golf courses are becoming crowded. It is thus important that golfers play at reasonable speeds to allow others to enjoy the golf course. Slow play by some players has thus become a significant problem, in that only a few slow players can delay many subsequent players.

The ideal round of golf requires approximately four hours to complete, but slow golfers often cause a round to take five or even six hours. Most golfers are thus upset by a five or six hour round of golf caused by excessive delays from slower players. Slow golfers disrupt the pace of other golfers, resulting in frustration and poorer scores. Many golfers refuse to play in crowded golf courses because slow play is more likely. Slow play reduces the number of golfers able to use a golf course, resulting in loss of revenue for the golf course.

Various attempts have been made to eliminate slow play. A golf course employee will sometimes personally observe golfers and detect slow play, but this method is expensive, inefficient, and disruptive. The employee can observe only one location at a time, and excessive employees may appear overbearing, as well as being expensive. Attempts to educate golfers regarding slow play have generally failed.

Moreover, due to an inability to monitor the play of all players on a course, golf courses are often not able to efficiently utilize their courses, thus reducing the available income from the courses.

Therefore, a need has arisen for a system to automatically and unobtrusively monitor play of a golfer and to notify the golfer and golf course personnel of slow play.

SUMMARY OF THE INVENTION

The present invention disclosed and claimed herein describes a system and method for monitoring play of a golfer. It is a technical advantage of this invention that problems created by slow golfers are substantially eliminated. It is a further advantage of the present invention that information regarding the play of a golfer enables golf course personnel to study utilization of golf carts and golf holes within the golf course.

In one aspect of the invention, a golfer is notified of a slow play condition. It is a technical advantage of this aspect of the invention that a golfer is automatically warned when to take corrective action by increasing the speed of play.

In another aspect of the invention, golf course personnel are also notified of a slow play condition. It is a technical advantage of this aspect of the invention that golf course personnel are immediately alerted when to direct corrective action.

In still another aspect of the invention, information regarding play of a golfer is reported and stored for retrieval at a later time. It is a technical advantage of this aspect of the invention that slow play of a particular golfer can be documented and proved.

BRIEF DESCRIPTION OF THE DRAWINGS

For a more complete understanding of the present invention, and the advantages thereof, reference is now made to the following description taken in conjunction with the accompanying drawings, in which:

FIG. 7 illustrates a logic flow diagram of the METAR operation;

FIG. 9 illustrates a block diagram of a Tracking Center of the present invention;

FIG. 14 illustrates a report from the tracking center.

DETAILED DESCRIPTION OF THE INVENTION

Figure 1:
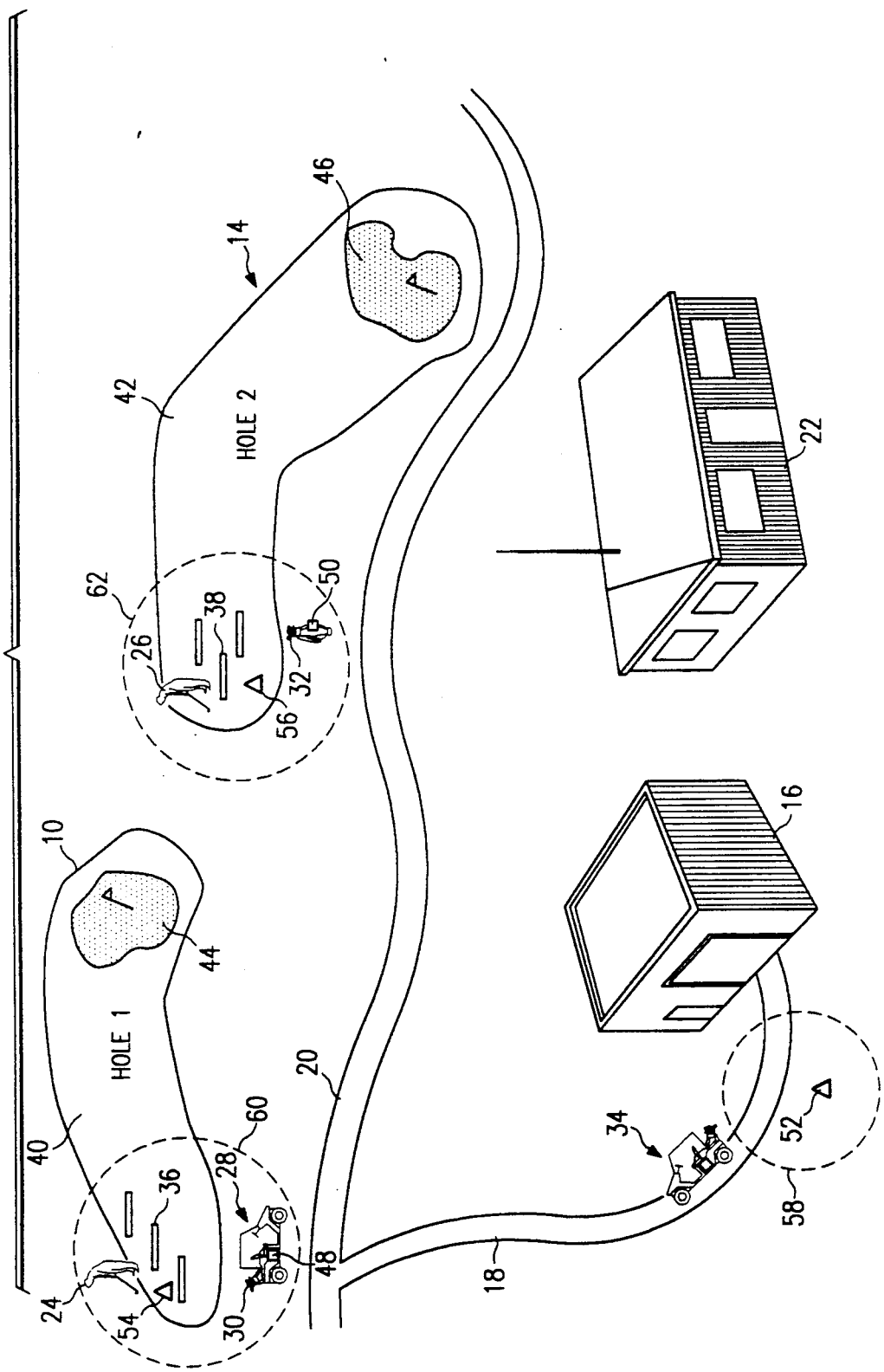
FIG. 1 illustrates a typical golf course equipped with the present invention.

The preferred embodiment of the present invention is best understood by referring to FIGS. 1-14 of the drawings, like numerals being used for like and corresponding parts of the drawing. FIG. 1 illustrates a typical golf course equipped with the present invention. The golf course contains numerous golf holes such as those indicated generally at 10 and 14, a golf cart barn 16, golf cart pathways 18 and 20, and a clubhouse 22. Additional golf holes included in the golf course are not shown in FIG. 1 but are of similar design as golf holes 10 and 14. Clubhouse 22 typically contains offices for golf course personnel and a golf shop which sells equipment. Golfers 24 and 26 usually enter clubhouse 22 prior to playing a round of golf. Golf carts such as those indicated generally at 28 and 34 are stored and maintained in golf cart barn 16. These golf carts 28 and 34 travel throughout the golf course along golf cart pathways 18 and 20. A golfer 24 may rent golf cart 28 for transportation of golfer 24 and golf clubs 30. Alternatively, golfer 26 may choose to carry golf clubs 32 without aid of a golf cart.

Golf holes 10 and 14 include tee box areas 36 and 38, fairways 40 and 42, and greens 44 and 46. Golfers 24 and 26 sequentially proceed through the various golf holes 10 and 14 of the golf course, usually playing a total of eighteen golf holes. At typical golf hole 10, golfer 24 begins play at tee box area 36 and proceeds to fairway 40, green 44 and ultimately to tee box area 38 of the next hole 14, where the play is continued in the same pattern.

In operation of the basic embodiment of the present invention, golfers 24 and 26 each have a transmitter device, known as a Mobile Electronic Transmitter/Receiver (METAR), 48 and 50 attached to either golf cart 28 or golf bag 32. Each METAR 48 and 50 receives data signals from a second type of transmitter and measures how long it takes golfer 24 and 26 to play golf hole 10 and 14. Transmitters of the second type, known as Location Information Transmitters (LIT's), 54 and 56 are placed within or adjacent to tee box areas 36 and 38, or in an alternative embodiment, adjacent greens or other areas. Each LIT transmits a signal representative of the location of the LIT to any METAR 48 and 50 within a specified low power RF transmission range indicated by dotted circles 60 and 62. If the play of golfer 24 at hole 10 exceeds a predetermined amount of time (stored in the memory of METAR 48), he is notified by an indicator on METAR 48 of his slow play.

In one embodiment, an additional tranmitter 52, called a course data transmitter (CDT) and similar to an LIT, is located adjacent to cart path 18 near cart barn 16. Course data (such as time allotted to each hole) is entered into the CDT by golf course personnel and the information is transmitted to any METAR passing through its low power RF transmission range 58. Each METAR then stores the information in its memory.

In the preferred embodiment shown in FIG. 1, METAR's 48 and 50 of the basic embodiment previously detailed are supplemented with transmitters to transmit unique identification signals to LIT's 54 and 56 which, in this embodiment, include receivers to receive the METAR transmissions. Each LIT transmitter also has the ability to transmit high power signals. Club house 22 contains a tracking center with a receiver for receiving the high power signals from the LIT's, a timer for timing golf play, and a display for monitoring the location and playing speed of each METAR which is associated with a golfer.

In operation, each LIT 54 periodically transmits a coded signal representing the location of LIT 54, such as a hole number. When golfer 24 with METAR 48 comes into range 60 of LIT 54, the circuitry of METAR 48 decodes the received signal and retrieves from its memory the length of time allotted for golfer 24 to play hole 10. A countdown timer in METAR 48 is then set to the allotted time and begun. When the timer reaches zero, indicating that golfer 24 has exceeded the allotted time for hole 10, METAR 48 notifies golfer 24 of the slow play. If golfer 24 completes hole 10 and crosses into range 62 of the next hole 14 before the count on the timer expires, the timer resets to the time allotted for hole 14 and the process continues for hole 14 and each subsequent hole.

Figure 2:
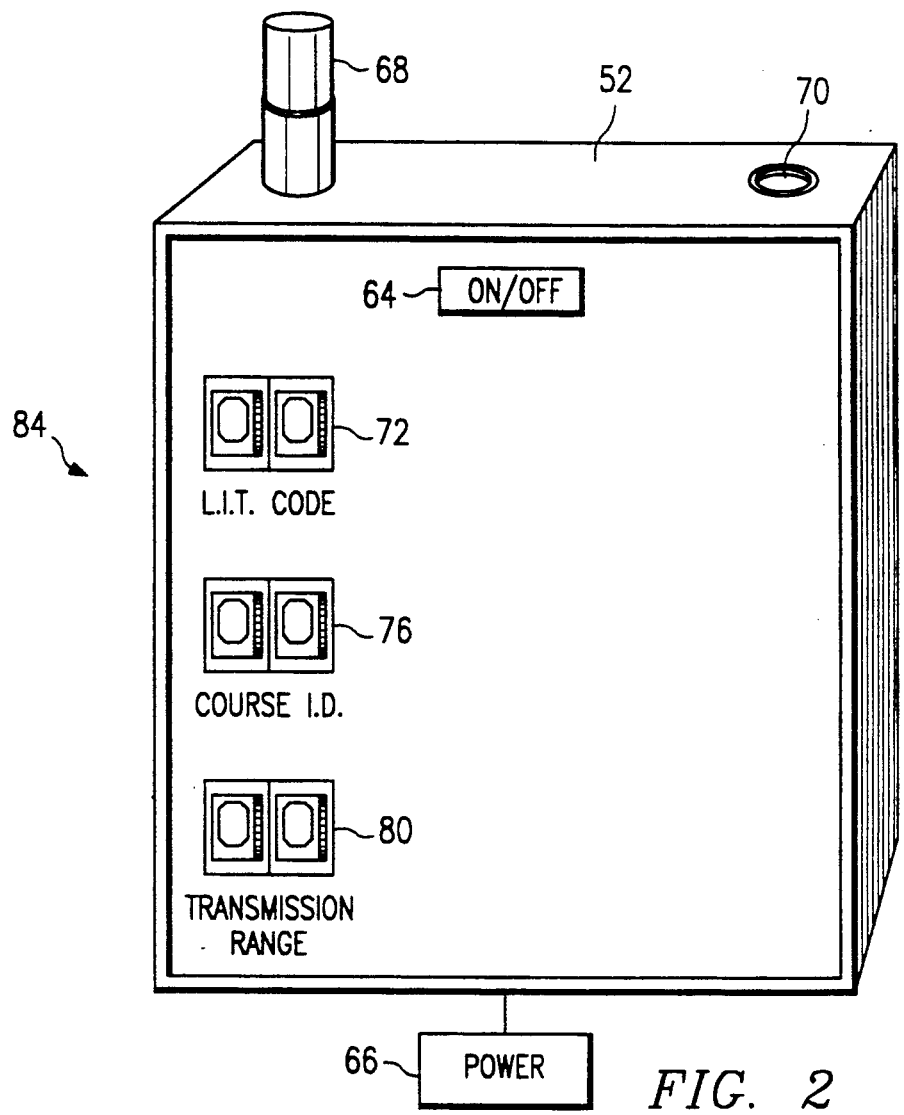
FIG. 2 illustrates a Location Information Transmitter (LIT) of the present invention.

The transmitter in LIT 54 also transmits a high powered signal to the tracking center indicating the identity of METAR 48 and its location. In this manner, golf course personnel can monitor the location of each golfer and identify any slow players. If necessary, a golf course employee can immediately request the slow player to increase the speed of play. Furthermore, habitual slow play can be documented and the player later reprimanded or disciplined. FIG. 2 illustrates an CDT of the present invention such as CDT 52. CDT 52 contains an ON/OFF switch 64, power source 66, antenna 68 and light detector 70. Thumbwheel switches, indicated generally at 84, respectively allow selection of an CDT code 72, which is different for each LIT in the golf course, course identification number 76 and transmission range 80. CDT 52 uses course identification number 76 to select its base transmission frequency, thus allowing simultaneous operation of the system at adjacent golf courses. Antenna 68 is used to transmit signals over specified transmission range 58. CDT 52 transmits a periodic signal containing the hole number or location code of CDT 52. Light detector 70 causes CDT 52 to shut off when it senses light levels which are insufficient for play, thus extending the useful life of power source 66.

Figure 3:
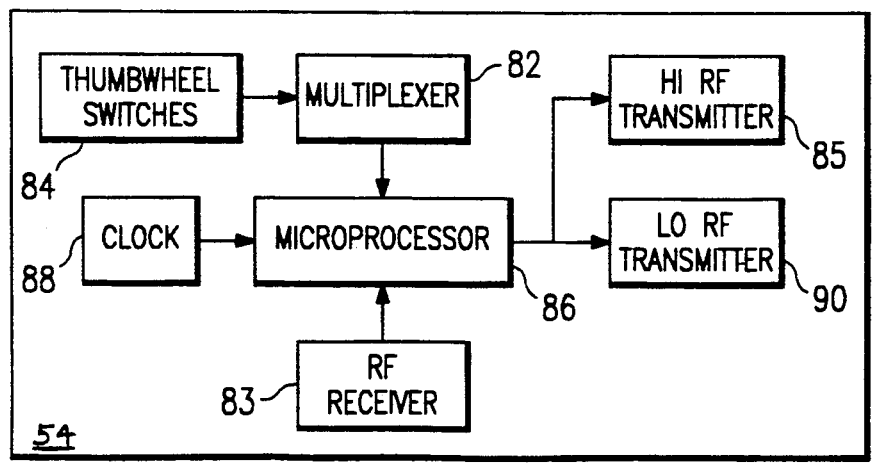
FIG. 3 illustrates a block diagram of the LIT.

FIG. 3 illustrates a block diagram of LIT 54. A multiplexer 82 converts positions of thumbwheel switches 84 into an input for a microprocessor 86. A clock 88 specifies the period of the LIT transmission. At specified time intervals, microprocessor 86 sends data to the an RF transmitter 90 for transmission of the location signal. In one embodiment, a receiver 83 is associated with LIT 54 to receive identification signals from METARs 48 and 50, and LIT 54 contains circuitry 85 to provide a high power RF transmission to clubhouse 22. The high power RF transmission contains the METAR identification and the LIT code to enable golf course personnel to monitor golf play.

Figure 4:
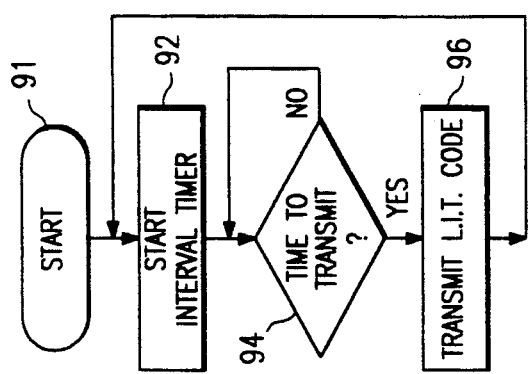
FIG. 4 illustrates a logic flow diagram of the LIT operation.

FIG. 4 illustrates a logic flow diagram of the operation of LIT 54. After power is applied in step 91, an interval timer is activated at step 92 to control the wait period between LIT transmissions. When the timer expires in step 94, LIT 54 transmits its specified LIT code in step 6. The interval timer is then restarted at step 92 and the cycle repeated.

Figure 5:
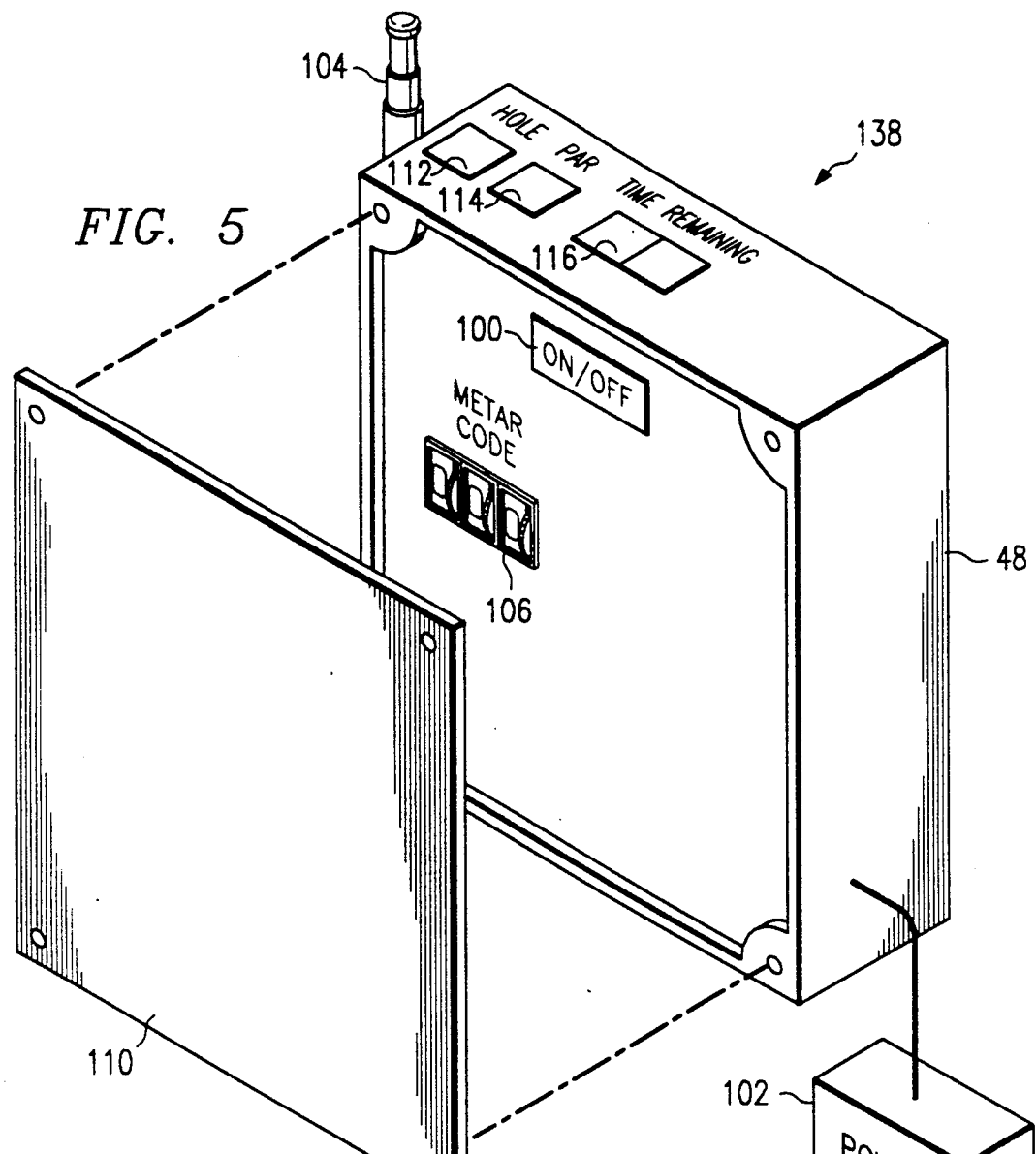
FIG. 5 illustrates a Mobile Electronic Transmitter Receiver (METAR) of the present invention.

FIG. 5 illustrates a METAR of the present invention, such as METAR 48, having an ON/OFF switch 100, power source 102 and antenna 104. Thumbwheel switches allow selection of a METAR code 106, which is different for each METAR in clubhouse 22. Golf course personnel attach a protective cover 110 to prevent unauthorized modifications to a thumbwheel switches 106. METAR 48 also contains displays, indicated generally at 138, which indicate the golf hole number 112 currently being played, number of par strokes 114 allocated to the golf hole, and time remaining to play the current golf hole 116.

Figure 6:
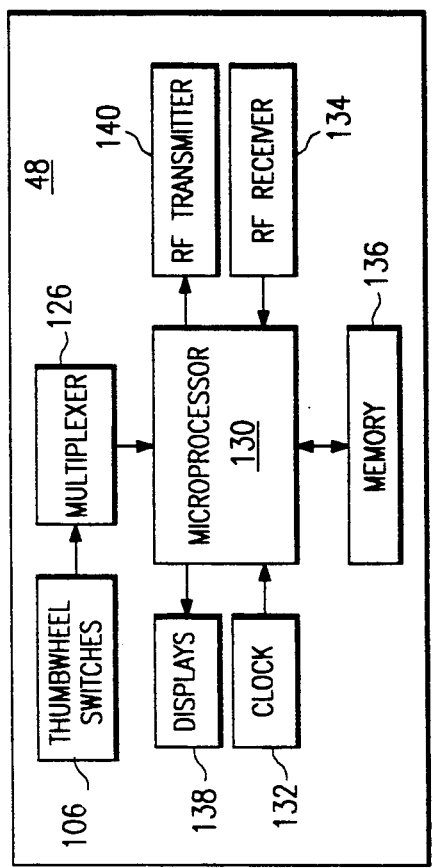
FIG. 6 illustrates a block diagram of the METAR.

FIG. 6 illustrates a block diagram of METAR 48. A multiplexer 126 converts the positions of thumbwheel switches 106 into an input signal for a microprocessor 130. A clock 132 controls the operation rate of microprocessor 130. An RF receiver 134 receives location signals transmitted from LIT 54 and sends this information to microprocessor 130. Based on the received information, METAR 48 retrieves data from its memory 136 and displays it on display 138. METAR 48 also transmits its identification code from an RF transmitter 140 to LIT 54. In one embodiment, METAR 48 receives course information, such as allotted time for each hole, from the LIT and stores the information in memory 136.

FIG. 7 illustrates a logic flow diagram of METAR 48 operation. After METAR 48 is initially activated in step 142, microprocessor 130 determines in decision block 142 whether receiver 134 has received a signal from nearby LIT 54. If not, microprocessor 130 loops until such a signal is received. When the LIT signal is received, microprocessor 130 directs RF transmitter 140 to transmits the METAR identification code in step 144. Microprocessor 130 then again determines in decision block 146 whether receiver 134 has received another LIT signal. If not, transmission delay time is changed in step 148 and control returns again to step 144; this loop will continue until microprocessor 130 determines in decision block 146 that receiver 134 has received the LIT signal. If the LIT signal is being received by METAR 48 for the first time, determined in decision block 150, then METAR display 138 is cleared in step 152, microprocessor 130 retrieves from memory 136 information concerning the hole and displays this information in step 154 on display 138. Then, microprocessor 130 begins the countdown timer in step 156 and execution continues with decision block 158.

If the signal received by METAR 48 from LIT 54 was not the first, or if it was the first and the countdown timer in step 156 has begun, then microprocessor 130 determines in decision block 158 whether the timer has reached zero. If so, golfer 24 has exceeded the allocated time to play the hole and display 138 indicates to golfer 24 of the slow play condition in step 160 and an audio alarm is activated in step 162. Execution then returns to step 142 and the process is repeated.

If the countdown timer has not received zero in decision block 158, execution returns directly to step 142.

Figure 8:
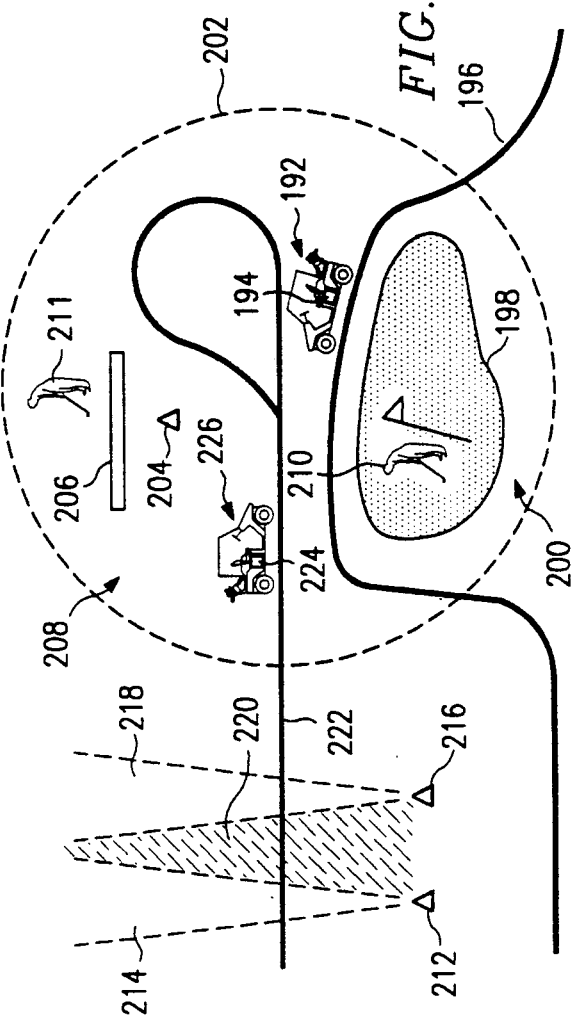
FIG. 8 illustrates the use of two LIT's at a single golf course location.

FIG. 8 illustrates an embodiment of the present invention using two LIT's at a single golf tee box area. As the golf cart, indicated generally at 192 and containing a METAR 194, travels along golf cart path 196 associated with green area 198 of a golf hole, indicated generally at 200, METAR 194 enters transmission range 202 of an LIT 204 located at tee box area 206 of adjacent golf hole, indicated generally at 208, even though a golfer 210 assigned to METAR 194 is not utilizing adjacent golf hole 208. This condition results in a false indication of activity by golfer 210 at adjacent golf hole 208.

The false indication of golfer 210 activity is corrected by replacing LIT 204 of adjacent golf hole 208 with a first LIT 212 having a first transmission range 214 and a second LIT 216 having a second transmission range 218. The two transmission ranges 214 and 218 define a border 220 across the appropriate golf cart path 222 associated with adjacent golf hole 208. The METAR 224 on the golf cart indicated generally at 226 is programmed to trigger upon passage of METAR 224 from second LIT 216 to first LIT 212. It can also be programmed to trigger upon passage from first LIT 212 to second LIT 216. In this manner, METAR 224 detects activity by golfer 211 at adjacent golf hole 208 only when golf cart 226 travels along golf cart path 222 associated with adjacent golf hole 208 and not when golf cart 192 travels along golf cart path 196.

As previously discussed, in one embodiment of the present invention, each LIT 54 and 56 transmits a high powe RF signal to a remote tracking center. FIG. 9 illustrates a block diagram of a Tracking Center, indicated generally at 227, normally located in clubhouse 22 of a golf course equipped with the present invention. The Tracking Center 227 has a power source 228. An RF receiver 230 receives radio signals from antenna 232 and outputs these signals to a scanner 234 monitoring various RF frequencies for METAR transmissions. When an LIT transmission is detected, the scanner outputs the received data to a CPU 236. CPU 236 stores and retrieves data in memory 238 and storage device 240. CPU 236 also outputs data to its display terminal 242 and printer 244. The keyboard 246 permits golf course personnel to enter instructions to CPU 236. In the preferred embodiment, CPU 236, memory 238 and storage 240 are contained in a personal computer (PC).

Figure 10:
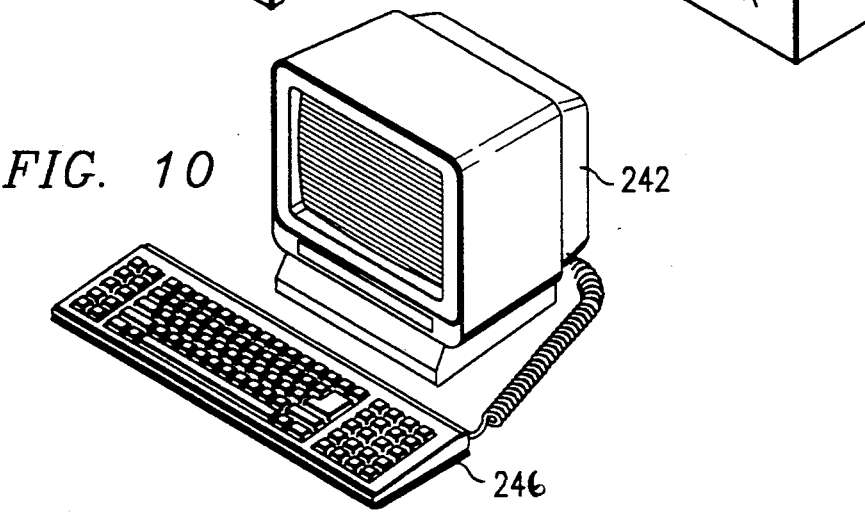
FIG. 10 illustrates a display terminal of the Tracking Center.

FIG. 10 illustrates the Tracking Center's 227 display terminal 242 and keyboard 246.

Figure 11:
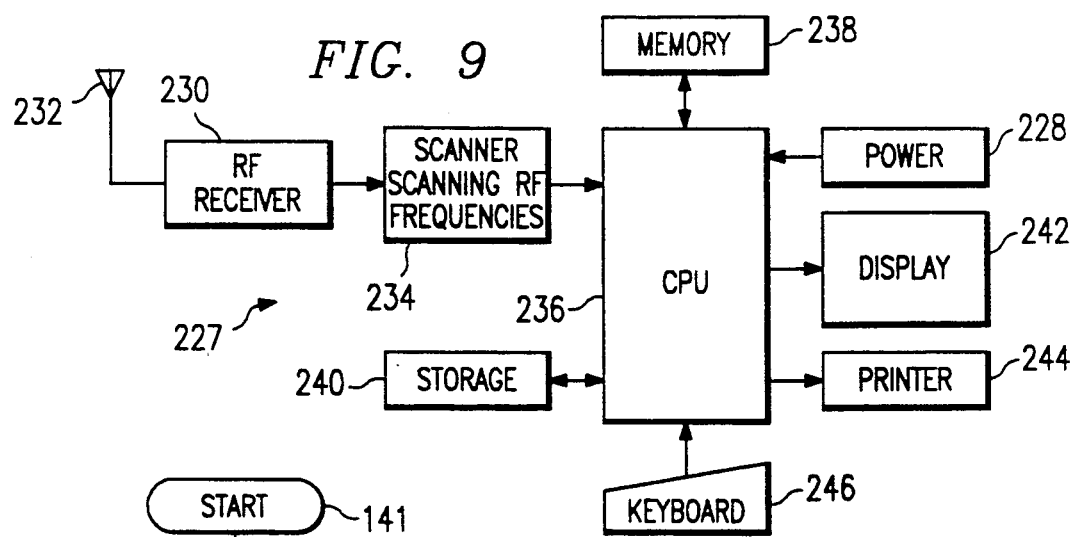
FIG. 11 illustrates a data chart on the display terminal.

FIG. 11 illustrates a data chart indicated generally at 248 displayed on display terminal 242. The data chart 248 indicates golf cart utilization, golf hole utilization and golfer activity at the golf course by displaying LIT numbers along one axis, indicated generally at 250, and time along the other axis, indicated generally at 252.

The position of a METAR code 254 on data chart 248 is a function of time 252 and location 250 of the corresponding METAR. The time base 260 is specified by golf course personnel to establish the interval between displayed times 252.

Figure 12:
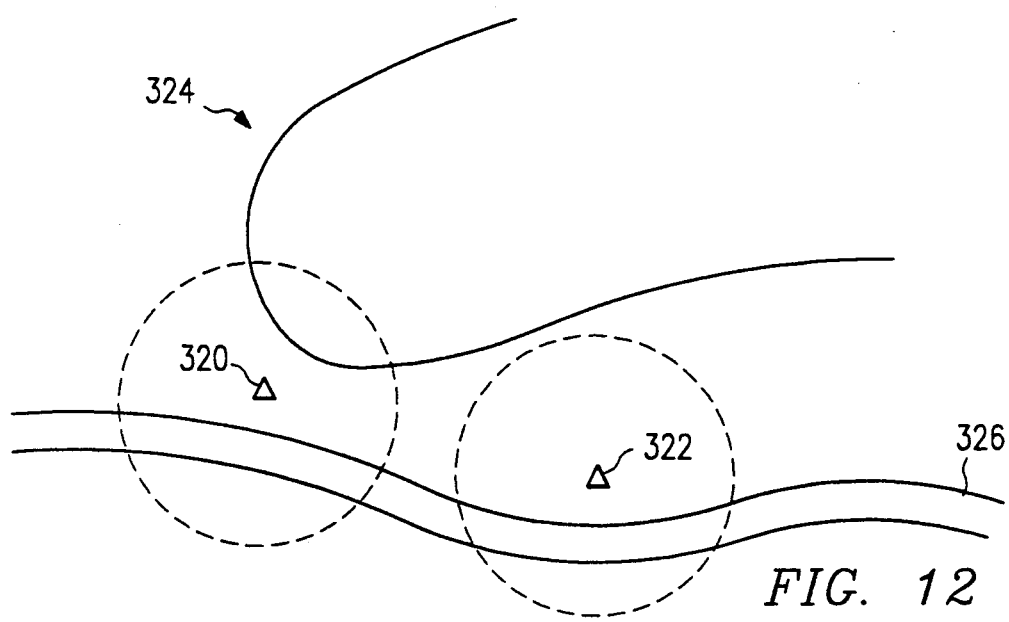
FIGS. 12 and 13 illustrate logic flow diagrams of the display terminal operation.

FIG. 12 illustrates one embodiment of the present invention wherein two LITs 320 and 322 are located at each golf hole 324 to distinguish between a golfer playing at the hole 324 and one who is merely passing by on an adjacent cart path 326. A timer is used in conjunction with a receiver at the golf course to measure the time between the transmissions of first LIT 320 and second LIT 322. If the measured time is less than a predetermined value, it is an indication that the golfer is passing through and his activity at golf hole 324 can be ignored. If, on the other hand, the measured time is greater than the predetermined value, then it indicates that the golfer is actually playing at golf hole 324 and his play will be monitored.

Figure 13:
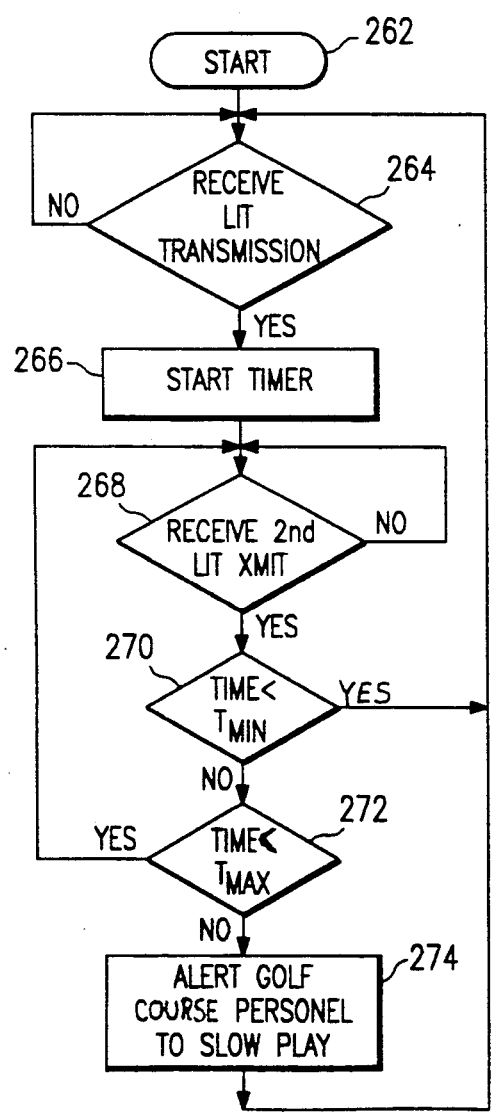

FIG. 13 illustrates a logic flow diagram of the tracking center 227 operation incorporating the embodiment of the present invention wherein, as discussed in conjunction with FIG. 12, two LITs 320 and 322 are used to distinguish between a golfer at golf hole 324 and one who is merely passing by on cart path 326. Execution begins with step 262 and, in decision block 264, the system determines whether a signal has been received from an LIT. If not, execution loops until such a transmission is received. When an LIT transmission is received, a timer is reset and started in step 266. Execution then waits until a transmission has been received, in decision block 268, from second LIT 322. When the transmission has been received, CPU 236 determines in decision block 270 whether the measured time is less than the minimum amount of time required for a golfer who is merely passing on cart path 326 to pass between the two LITs 320 and 322. If so, execution returns to decision block 264 to await another LIT transmission.

If the golfer is not passing through, CPU 236 determines in decision block 272 whether the measured time exceeds the time allotted to the golfer at golf hole 324. If the maximum time has not been exceeded, then execution returns to decision block 268. If the maximum amount of time has been exceeded, then CPU 236 alerts golf course personnel of the slow play on golf hole 324.

Data chart 248 automatically shifts the contents of the screen to the left at appropriate intervals in order that the information displayed remains current. Data chart 248 also dynamically indicates the status and location of golf carts and golfers throughout the golf course. In FIG. 11, for example, the golfer utilizing METAR #22 has created a slow play condition during the time interval from 10:10 to 10:19 on hole number 4. This same golfer also played 10:20 and 10:29 on hole number 5, thus causing a second golfer utilizing METAR #18 to slow play at hole number 5 between 10:30 and 10:39. The initial slow play condition ultimately compounded itself by causing golfers using METARs #9 and #33 to also slow play.

All information displayed on the data chart is stored by the Tracking Center 227 for retrieval at a later time. This feature enables golf course personnel to document and prove slow play of a particular golfer and to study the utilization of golf carts and golf holes within the golf course.

FIG. 14 illustrates a report of slow play data. Each row of the report contains METAR number 278, the golf hole where slow play occurred 280, the par value assigned to the particular golf hole 282, the ideal time for playing golf hole 284, and the actual playing time taken of golfer 286.

Although a preferred embodiment of the present invention has been described in detail, this embodiment is subject to various changes, substitutions and alterations which can be made without departing from the spirit and scope of the invention as defined by the appended claims.

What is claimed is:

1. A system for monitoring a golfer's play within a golf course, comprising:
   a mobile transmitter carrier in association with said golfer for transmitting an identification signal associated therewith;
   a plurality of location receivers each proximate to a corresponding golf hole within said golf course and each operable to receive said identification signal responsive to said golfer being proximate to said corresponding golf hole;
   a plurality of first location transmitters each operable to transmit one or more play monitoring signals responsive to said identification signal received by an associated location receiver, first ones of said play monitoring signals indicating when said golfer is proximate to each said golf hole corresponding to said associated location receiver and second ones of said play monitoring signals indicating when said golfer ceases being proximate to each said golf hole corresponding to said associated location receiver;
   means for determining a length of time for said golfer to play one of said corresponding golf holes based upon said first and second play monitoring signals; and
   means for comparing a predetermined time against said length of time for said golfer to play in order to enable the determination of whether the golfer played the golf hole within the predetermined time.

2. The system of claim 1 and further comprising:
   a plurality of second location transmitter each proximate to one of said corresponding golf holes and said operable to transmit a corresponding location signal; and
   a mobile receiver carried in association with said golfer for receiving said corresponding location signals each responsive to said golfer being proximate said golf hole corresponding to said location signal, and wherein said mobile transmitter transmits said identification signal in response to said mobile receiver receiving one of said corresponding location signals.

3. The system of claim 1 and further comprising means responsive to said determining means for indicating a slow play occurrence responsive to said golfer failing to play the golf hole within the predetermined time.

4. The system of claim 1 and further comprising a monitoring receiver for receiving said play monitoring signals.

5. The system of claim 4 wherein said monitoring receiver is further operable to receive a reference signal from a predetermined location within said golf course and further comprising means coupled to said monitoring receiver for determining whether said golfer is playing one of said corresponding golf holes, based upon whether said monitoring receiver receives one of said play monitoring signals prior to receiving said reference signal.

6. The system of claim 4 wherein said monitoring receiver is further operable to receive a reference signal from a predetermined location within said golf course and further comprising means coupled to said monitoring receiver for determining whether said golfer is playing one of said corresponding golf holes, based upon whether said monitoring receiver receives one of said play monitoring signals within a specified time of receiving said reference signal.

7. The system of claim 1 and further comprising means for displaying which of said corresponding golf holes said golfer is playing based upon said first and second play monitoring signals.

8. The system of claim 1 and further comprising means for monitoring a time when said golf cart is utilized within said golf course, based upon said first and second play monitoring signals.

9. The system of claim 1 and further comprising:
   a data transmitter proximate to a predetermined location within said golf course, operable to transmit a data signal indicative of a golf course information; and
   a mobile receiver carried in association with said golfer for receiving said data signal responsive to said golfer being proximate to said predetermined location.

10. The system of claim 1 wherein said first location transmitters are each further operable to transmit responsive to a command from said golfer.

11. The system of claim 1 wherein said mobile transmitter carried in association with said golfer is carried by a golf cart of said golfer.

12. The system of claim 1 wherein said mobile transmitter carried in association with said golfer is carried by a golf bag of said golfer.

13. The system of claim 1 wherein said mobile transmitter carried in association with said golfer is carried by said golfer.

14. A method for monitoring a golfer's play within a golf course, comprising the steps of:
   transmitting an identification signal associated with a mobile transmitter carried in association with said golfer;
   receiving said identification signal with each of a plurality of location receivers each proximate to a corresponding golf hole within said golf course and each in response to said golfer being proximate to said corresponding golf hole;
   transmitting one or more play monitoring signals from each of a plurality of first location transmitters each in response to said identification signal received by an associated location receiver, first ones of said play monitoring signals indicating when said golfer is proximate to each said golf hole corresponding to said associated location receiver and second ones of said play monitoring signals indicating when said golfer ceases being proximate to each said golf hole corresponding to said associated location receiver;
   determining a length of time for said golfer to play one of said corresponding golf holes, based upon said first and second play monitoring signals; and
   comparing a predetermined time against said length of time for said golfer to play in order to enable the determination of whether the golfer played the golf hole within the predetermined time.

15. The method of claim 14 and further comprising the steps of
   transmitting a corresponding location signal from each of a plurality of second location transmitters each proximate to one of said corresponding golf holes; and
   receiving said corresponding location signals with a mobile receiver carried in association with said golfer, each in response to said golfer being proximate said golf hole corresponding to said location signal, and wherein said step of transmitting an identification signal comprises the step of transmitting said identification signal in response to said mobile receiver receiving one of said corresponding location signals.

16. The method of claim 14 and further comprising the step of indicating a slow play occurrance in response to said golfer failing to play the golf hole within the predetermined time.

17. The method of claim 14 and further comprising the step of receiving said play monitoring signals with a monitoring receiver at a monitoring location within said golf course.

18. The method of claim 17 and further comprising the steps of:
   receiving a reference signal with said monitoring receiver from a predetermined location within said golf course; and
   determining whether said golfer is playing one of said corresponding golf holes based upon whether said monitoring receiver receives one of said play monitoring signals prior to receiving said reference signal.

19. The method of claim 17 and further comprising the steps of:
   receiving a reference signal with said monitoring receiver from a predetermined location within said golf course; and
   determining whether said golfer is playing one of said corresponding golf holes based upon whether said monitoring receiver receives one of said play monitoring signals within a specified time of receiving said reference signal.

20. The method of claim 14 and further comprising the step of displaying which of said corresponding golf holes said golfer is playing based upon said first and second play monitoring signals.

21. The method of claim 14 and further comprising the step of monitoring a time when a golf cart of said golfer is utilized within said golf course, based upon said first and second play monitoring signals wherein said mobile transmitter carried in association with said golfer is carried by said golf cart.

22. The method of claim 14 and further comprising the steps of:
   transmitting a data signal with a data transmitter proximate to a predetermined location within said golf course, said data signal being indicative of a golf course information; and
   receiving said data signal with a mobile receiver carried in association with said golfer, in response to said golfer being proximate to said predetermined location.

23. The method of claim 14 wherein said step of transmitting said play monitoring signals comprises the step of transmitting one or more play monitoring signals from each of a plurality of first location transmitters each in response to a command from said golfer.

* * * * *